(12) United States Patent
Nishino et al.

(10) Patent No.: US 8,309,250 B2
(45) Date of Patent: Nov. 13, 2012

(54) BATTERY HAVING FIRE EXTINGUISHING ELEMENT IN MESH FORM

(75) Inventors: Hajime Nishino, Nara (JP); Masato Fujikawa, Osaka (JP); Tomohiko Yokoyama, Osaka (JP); Mikinari Shimada, Osaka (JP)

(73) Assignee: Panasonic Corporation, Osaka (JP)

( * ) Notice: Subject to any disclaimer, the term of this patent is extended or adjusted under 35 U.S.C. 154(b) by 584 days.

(21) Appl. No.: 12/380,702

(22) Filed: Mar. 3, 2009

(65) Prior Publication Data

US 2009/0226803 A1    Sep. 10, 2009

(30) Foreign Application Priority Data

Mar. 4, 2008    (JP) .................................. 2008-053000

(51) Int. Cl.
*H01M 2/00*    (2006.01)
*H01M 6/42*    (2006.01)

(52) U.S. Cl. ........ 429/163; 429/185; 429/178; 429/149; 429/82

(58) Field of Classification Search .................... 429/82, 429/83, 71, 53, 56, 7, 163, 174, 185, 178, 429/161, 149, 151
See application file for complete search history.

(56) References Cited

U.S. PATENT DOCUMENTS

2007/0003825 A1*  1/2007  Touchton et al. ............... 429/97
2007/0154789 A1*  7/2007  Chang et al. .................. 429/130

FOREIGN PATENT DOCUMENTS

JP    4-286874 A    10/1992
JP    9-161754 A    6/1997

* cited by examiner

*Primary Examiner* — Raymond Alejandro
(74) *Attorney, Agent, or Firm* — Brinks Hofer Gilson & Lione

(57) ABSTRACT

A battery includes an electrode group, a case, a sealing member, and a mesh portion. The electrode group includes a positive electrode, a negative electrode opposing the positive electrode, an electrolyte interposed between the positive electrode and the negative electrode. The case has an opening and contains the electrode group. The sealing member closes the opening of the case. The mesh portion is provided so as to face an exhaust hole formed in at least one of the case and the sealing member. The mesh is formed of a thermally conductive material to put off frame coming out of the exhaust hole, in case where the battery is so defective to ignite fire.

14 Claims, 12 Drawing Sheets

FIG. 9A
FIG. 9B
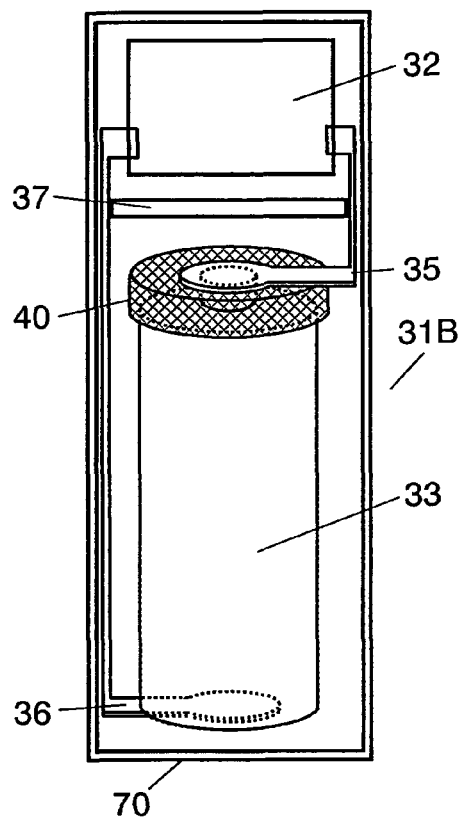
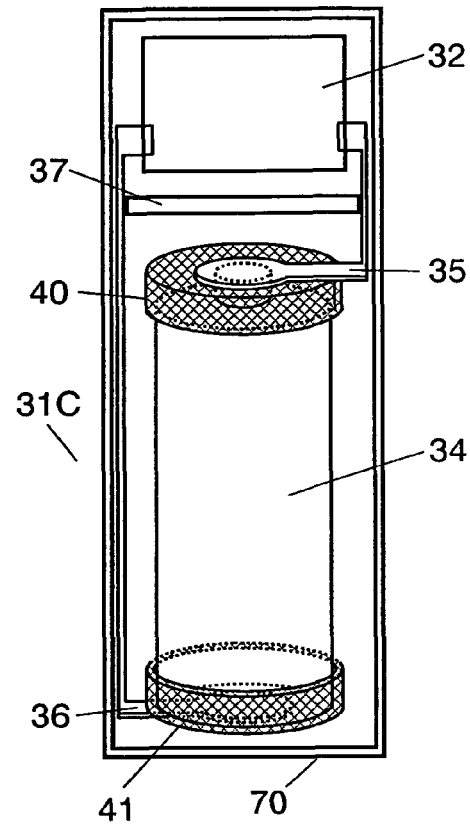

BATTERY HAVING FIRE EXTINGUISHING ELEMENT IN MESH FORM

RELATED APPLICATIONS

This application claims priority under 35 U.S.C. §119 to Japanese Patent Application No. JP2008-053000 filed on Mar. 4, 2008, the entire content of which is hereby incorporated by reference.

BACKGROUND OF THE INVENTION

1. Field of the Invention

The present invention relates to a battery including a case containing a positive electrode and a negative electrode that are disposed with a separator sandwiched therebetween, a battery pack having an enclosure containing the battery and a circuit, and a method of manufacturing a connection terminal for making up the battery pack.

2. Background Art

Recently, with the widespread of portable and cordless electronic equipment, batteries as driving power sources of the equipment have been increasingly used. Among them, compact and lightweight secondary batteries having large energy density such as nickel hydrogen storage batteries and lithium ion batteries have received attention.

However, cases have been reported that lithium ion batteries cause firing due to contamination of conductive foreign matters in a cell during manufacture or failure in a safety protection function of a pack circuit. In order to address such problems of firing, a configuration in which a fire-extinguishing agent is provided inside a battery, and a configuration in which a fire-extinguishing agent is provided inside a battery pack containing batteries have been proposed.

However, the configuration in which a fire-extinguishing agent is provided in a battery or a battery pack is disadvantageous to miniaturization of the battery or the battery pack. When the miniaturization of a battery or a battery pack is hindered, a miniaturization of equipment incorporating the battery or the battery pack may be hindered.

SUMMARY OF THE INVENTION

A battery of the present invention includes an electrode group, a case, a sealing member, and a mesh portion. The electrode group includes a positive electrode, a negative electrode opposing the positive electrode, an electrolyte interposed between the positive electrode and the negative electrode. The case has an opening and contains the electrode group. The sealing member closes the opening of the case. The mesh portion is provided so as to face an exhaust hole formed in at least one of the case and the sealing member.

Furthermore, a battery pack of the present invention includes a battery, a connection terminal, an enclosure, and a mesh portion. The battery includes an electrode group, a case and a sealing member. The electrode group includes a positive electrode, a negative electrode facing the positive electrode, an electrolyte interposed between the positive electrode and the negative electrode. The case has an opening and contains the electrode group. The sealing member closes the opening of the case. An exhaust hole is formed on at least one of the case and the sealing member. The connection terminal is electrically connected to the battery. The enclosure contains the battery and the connection terminal. The mesh portion is provided so as to face the exhaust hole.

Furthermore, in a method of manufacturing a connection terminal of the present invention, firstly, a plurality of staggered holes are formed on a metal plate except for a band-shaped portion. Then, the portion provided with the staggered holes is stretched in the direction away from the band-shaped portion, thereby forming a mesh portion from the portion provided with the staggered holes.

BRIEF DESCRIPTION OF THE DRAWINGS

FIGS. 8B to 9B are configuration views of other battery packs in accordance with the sixth embodiment of the present invention.

DETAILED DESCRIPTION OF THE PREFERRED EMBODIMENTS

Hereinafter, embodiments of the present invention are described with reference to drawings. Note here that the present invention is not necessarily limited to the below-mentioned embodiments as long as it is based on the basic features described in the specification.

First Embodiment

Figure 1:
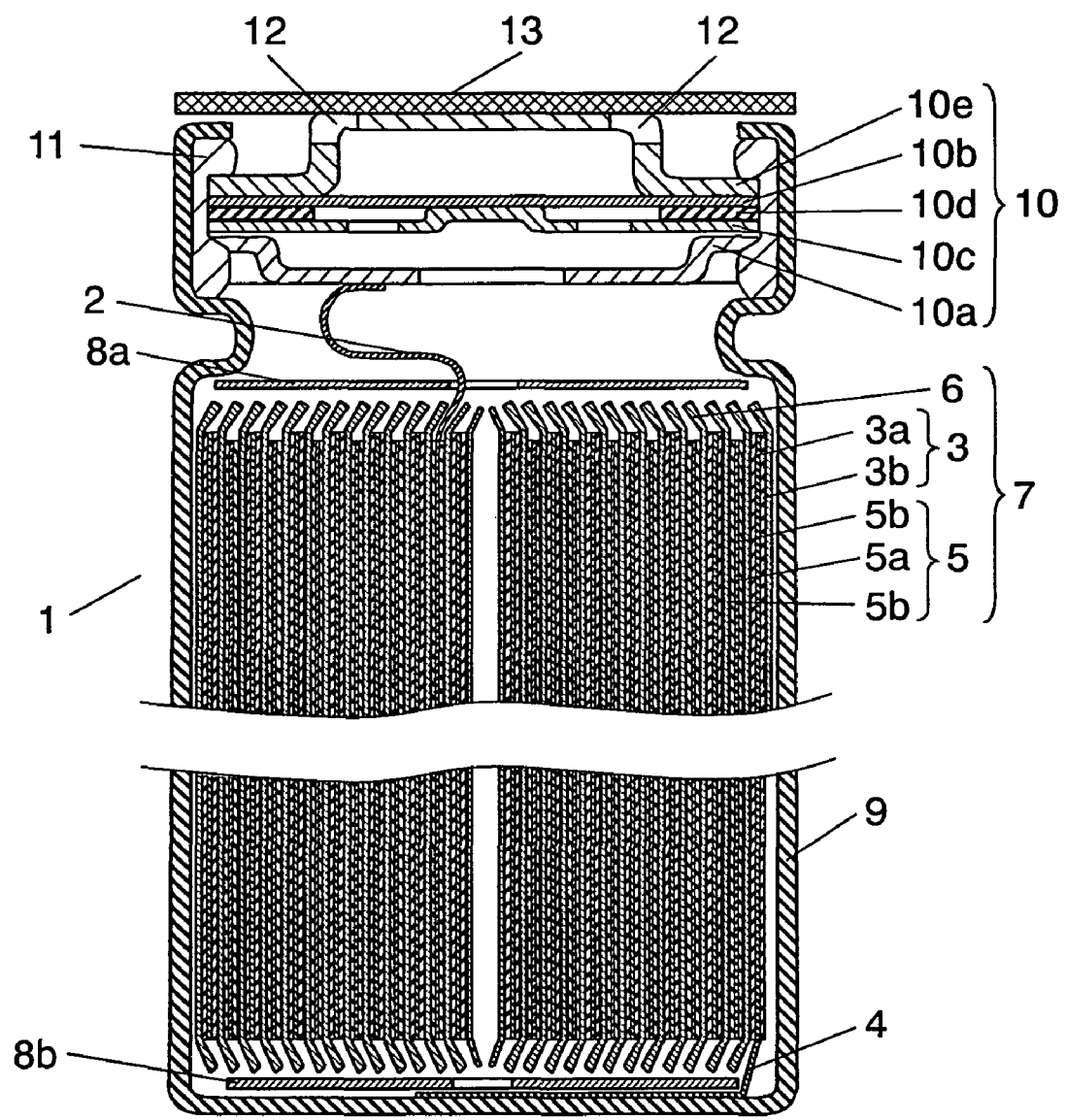
FIG. 1 is a sectional view of a battery in accordance with a first embodiment of the present invention.

FIG. 1 is a sectional view of a battery in accordance with a first embodiment of the present invention, and FIG. 2 is a plan view and a perspective view thereof. A battery in this embodiment includes a lithium ion battery as a nonaqueous electrolyte secondary battery as a component.

Battery main body 1 made of a cylindrical lithium ion battery includes electrode group 7 in which positive electrode 3 and negative electrode 5 opposing positive electrode 3 are wound via separator 6. Positive electrode 3 includes positive electrode lead 2 made of, for example, aluminum. At one end of negative electrode 5, negative electrode lead 4 made of, for example, copper is provided.

Insulating plates 8a and 8b are mounted on the upper and lower parts of electrode group 7. In this state, electrode group 7 is inserted into case 9, another end of positive electrode lead 2 is welded to sealing member 10, and another end of negative electrode lead 4 is welded to the inner bottom of case 9.

Furthermore, a nonaqueous electrolyte (not shown) conducting lithium ion is filled in case 9 and an opening end portion of case 9 is caulked to sealing member 10 via gasket 11. Positive electrode 3 has positive current collector 3a and positive electrode mixture layer 3b including a positive electrode active material. Negative electrode 5 has negative electrode current collector 5a and negative electrode active material layer 5b formed of columnar bodies.

Sealing member 10 has junction portion 10a, safety valve 10b, safety valve holder 10c, current-limiting element 10d, and positive terminal 10e. An end of positive electrode lead 2 is welded to junction portion 10a. When an internal pressure of case 9 is increased, safety valve 10b ruptures before case 9 is destroyed, thus reducing the internal pressure of case 9. Safety valve holder 10c holds safety valve 10b. Current-limiting element 10d is located between safety valve 10b and safety valve holder 10c, and prevents a not less than a specified current from flowing. Junction portion 10a, safety valve 10b, safety valve holder 10c, current-limiting element 10d and positive terminal 10e are electrically connected to each other at the edge portions.

Furthermore, each element of sealing member 10 except for safety valve 10b is provided with a vent hole. The vent hole formed in positive terminal 10e is exhaust hole 12 from which a gas is discharged when the internal pressure of case 9 is increased and safety valve 10b ruptures. Three to four exhaust holes 12 are formed in a circular arrangement at substantially equal intervals on the upper part of positive terminal 10e. The thus configured sealing member 10 together with case 9 defines a contour of battery main body 1.

Mesh portion 13 made of incombustible, thermally conductive and electrically conductive wires is provided on positive terminal 10e so as to face exhaust hole 12. The wire of mesh portion 13 is formed of stainless steel (SUS), an elemental substance such as copper, nickel, aluminum, iron, gold, platinum, and silver, or plurality of layers of a plated substance or a clad. Mesh portion 13 is fixed to positive terminal 10e by using a conductive adhesive or by ultrasonic welding or resistance welding, and the like.

Figure 2A:
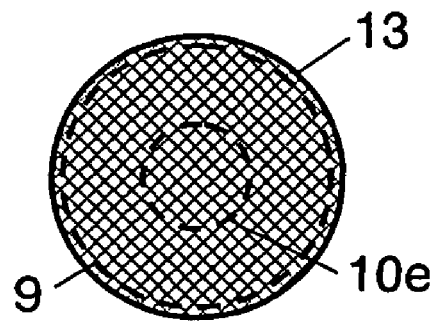
FIG. 2A is a plan view of the battery shown in FIG. 1.
Figure 2B:
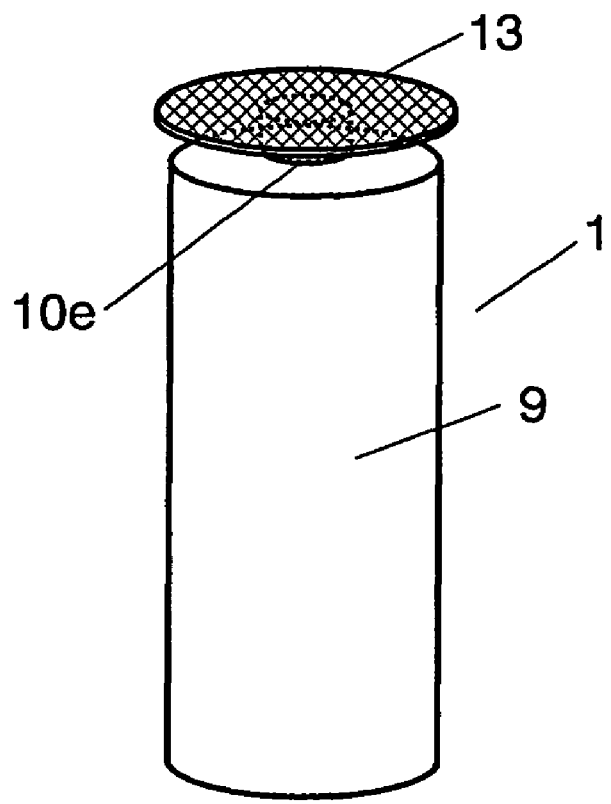
FIG. 2B is a perspective view of the battery shown in FIG. 2A.

Mesh portion 13 is formed in a circular shape (or disk-like shape) as shown in FIGS. 2A and 2B, and is disposed in such a manner that it overlaps with the entire surface of the upper end portion of battery main body 1 including positive terminal 10e. However, mesh portion 13 may not cover entire exhaust hole 12. Mesh portion 13 may be provided to face exhaust hole 12 so that a gas or a flame passes through mesh portion 13 when the gas or the flame is discharged from exhaust hole 12. However, it is preferable that mesh portion 13 covers exhaust hole 12. Thus, flames discharged from exhaust hole 12 are brought into contact with mesh portion 13 without fail. As a result, the flames can be extinguished reliably.

Furthermore, it is preferable that mesh portion 13 covers an opening of case 9 when exhaust hole 12 is formed in sealing member 10. Thus, flames are brought into contact with mesh portion 13 without fail regardless of the direction in which the flames are discharged from exhaust hole 12. Moreover, mesh portion 13 covers an opening of case 9 provided with sealing member 10 having exhaust hole 12. Thus, mesh portion 13 can be extended without increasing the size of a battery, so that the heat capacity of mesh portion 13 is increased and the heat absorbing effect is strengthened. Consequently, the flames can be extinguished more reliably.

When the hole size of mesh portion 13 is too small, mesh portion 13 blocks flames and bounces the flames back. When the hole size is too large, the heat exchange efficiency drops and heat cannot be absorbed efficiently. Thus, flames cannot be extinguished. Therefore, the hole size is preferably, for example, not smaller than 0.1 mm×0.1 mm and not larger than 3.0 mm×3.0 mm. The preferable size is similarly applied to mesh portions in other embodiments.

An example of materials to be used for positive current collector 3a includes aluminum (Al), carbon, electrically conductive resin, and the like. Furthermore, any of these materials may be subjected to surface treatment with carbon and the like.

Positive electrode mixture layer 3b includes a lithium-containing composite oxide such as $LiCoO_2$, $LiNiO_2$, $LiMnO_4$, or a mixed compound thereof or a composite compound thereof as the positive electrode active material. As the positive electrode active material, besides the above-mentioned materials, olivine-type lithium phosphate expressed by the general formula: $LiMPO_4$ (M represents V, Fe, Ni or Mn) and lithium fluorophosphate expressed by the general formula: $Li_2MPO_4F$ (M represent V, Fe, Ni or Mn) can be used. Furthermore, a part of the constituent elements of these lithium-containing compounds may be substituted by a different kind of element. The surface of lithium-containing compounds may be treated with metallic oxide, lithium oxide, conductive agent, and the like. The surface of lithium-containing compounds may be subjected to hydrophobic treatment.

Positive electrode mixture layer 3b may further include a conductive agent and/or a binder. An example of the conductive agent may include graphites including natural graphites and artificial graphites; carbon blacks such as acetylene black, Ketjen black, channel black, furnace black, lampblack and thermal black; conductive fibers such as carbon fiber and metal fiber; metal powders such as aluminum powders; conductive whiskers of zinc oxide, potassium titanate, and the like; conductive metallic oxide such as titanium oxide; an organic conductive material such as phenylene derivatives, and the like.

For negative electrode current collector 5a, a metal foil of SUS, nickel, copper, titanium, and the like, and a thin film of carbon and conductive resin, and the like, may be used. In addition, such material can be subjected to a surface treatment with carbon, nickel, titanium, and the like A material of the columnar bodies constituting negative electrode active material layer 5b may include an active material such as silicon (Si) and tin (Sn) capable of reversibly absorbing and releasing lithium ions and having a theoretical capacity density of more than 833 mAh/cm$^3$. Negative electrode active material layer 5b may be formed by using fine particles of a negative electrode active material, and a conductive agent and a binder similar to those for positive electrode mixture layer 3b in addition to the above-mentioned columnar bodies. In this case, as the negative electrode active material, in addition to the above-mentioned materials, carbon materials capable of reversibly absorbing and releasing lithium ions may be used.

As the nonaqueous electrolyte, an electrolyte solution obtained by dissolving a solute in an organic solvent, a polymer electrolyte layer containing such an electrolyte solution and immobilized by a polymer can be used. When the electrolyte solution is used, it is preferable that separator 6 such as a non-woven fabric and a microporous membrane is used between positive electrode 3 and negative electrode 5, and separator 6 is impregnated with an electrolyte solution. An example of materials of separator 6 includes polyethylene, polypropylene, aramid resin, amide-imide, polyphenylene sulfide, polyimide, and the like.

Furthermore, the inside or on the surface of separator 6, a heat resistant filler such as alumina, magnesia, silica, and titania may be included. Besides separator 6, a heat resistant layer composed of such heat resistant filler and a binder similar to that used for positive electrode 3 or negative electrode 5 may be provided.

The material of the nonaqueous electrolyte is selected based on the oxidation-reduction potential of each active material. An example of a solute preferably used for the nonaqueous electrolyte may include salts generally used in a lithium battery, for example, $LiPF_6$, $LiBF_4$, $LiClO_4$, $LiAlCl_4$, $LiSbF_6$, LiSCN, $LiCF_3SO_3$, $LiNCF_3CO_2$, $LiAsF_6$, $LiB_{10}C_{10}$, lower aliphatic lithium carboxylate, LiF, LiCl, LiBr, LiI, chloroborane lithium, bis(1,2-benzenedioleate(2-)-O,O')borate, lithium bis(2,3-naphthalenedioleate(2-)-O,O')borate, lithium bis(2,2'-biphenyldioleate(2-)-O,O')borate, lithium bis(5-fluoro-2-oleate-1-benzenesulfonate-O,O')borate and other borates, $(CF_3SO_2)_2NLi$, $LiN(CF_3SO_2)(C_4F_9SO_2)$, $(C_2F_5SO_2)_2NLi$, lithium tetraphenyl borate, and the like.

Furthermore, as an example of an organic solvent in which the above-mentioned salts are dissolved, for example, ethylene carbonate (EC), propylene carbonate, butylene carbonate, vinylene carbonate, dimethyl carbonate (DMC), diethyl carbonate, ethyl methyl carbonate (EMC), dipropyl carbonate, methyl formate, methyl acetate, methyl propionate, ethyl propionate, dimethoxymethane, γ-butyrolactone, γ-valerolactone, 1,2-diethoxyethane, 1,2-dimethoxyethane, ethoxymethoxyethane, trimethoxy methane, tetrahydrofuran, tetrahydrofuran derivative such as 2-methyltetrahydrofuran, dimethyl sulfoxide, dioxolane derivative such as 1,3-dioxolane, 4-methyl-1,3-dioxolane, formamide, acetamide, dimethylformamide, acetonitrile, propyl nitrile, nitromethane, ethyl monoglyme, phosphotriester, acetic acid ester, propionic acid ester, sulfolane, 3-methyl sulfolane, 1,3-dimethyl-2-imidazolidinone, 3-methyl-2-oxazolidinone, propylene carbonate derivative, ethyl ether, diethyl ether, 1,3-propanesultone, anisole, and fluorobenzene, may be used singly or may be in a combination of one or more thereof.

In this way, it is possible to use a solvent that is generally used in a lithium battery.

Furthermore, an additive such as vinylene carbonate, cyclohexylbenzene, biphenyl, diphenyl ether, vinyl ethylene carbonate, divinyl ethylene carbonate, phenylethylene carbonate, diallyl carbonate, fluoroethylene carbonate, catechol carbonate, vinyl acetate, ethylene sulfite, propanesultone, trifluoropropylene carbonate, dibenzofuran, 2,4-difluoroanisole, o-terphenyl, and m-terphenyl may be included.

Note here that a nonaqueous electrolyte may be used as a solid electrolyte obtained by mixing the above-mentioned solute in one or more of polymer materials such as polyethylene oxide, polypropylene oxide, polyphosphazene, polyaziridine, polyethylene sulfide, polyvinyl alcohol, polyvinylidene fluoride, and polyhexafluoropropylene. Furthermore, it may be used as a gel-state mixture with the above-mentioned organic solvent.

Furthermore, an inorganic material such as lithium nitride, lithium halide, lithium oxoate, $Li_4SiO_4$, $Li_4SiO_4$—LiI—LiOH, $Li_3PO_4$—$Li_4SiO_4$, $Li_2SiS_3$, $Li_3PO_4$—$Li_2S$—$SiS_2$, a phosphorus sulfide compound, and the like, may be used as a solid electrolyte.

When a gel-state nonaqueous electrolyte is used, a gel-state nonaqueous electrolyte instead of a separator may be disposed between positive electrode 3 and negative electrode 5. Alternatively, the gel-state nonaqueous electrolyte may be disposed in the vicinity of separator 6.

Figure 3A:
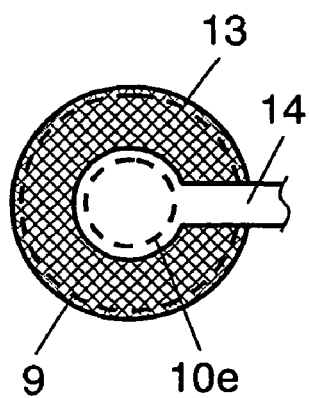
FIG. 3A is a plan view showing a state in which a connection terminal is connected to the battery shown in FIG. 2A.
Figure 3B:
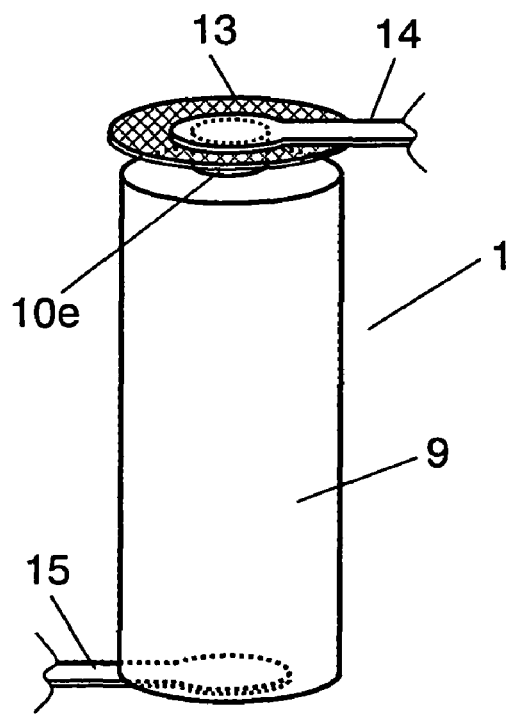
FIG. 3B is a perspective view showing a state in which a connection terminal is connected to the battery shown in FIG. 2B.

FIGS. 3A and 3B are a plan view and a perspective view each showing a configuration in which connection terminals 14 and 15 are connected to a battery in accordance with this embodiment, respectively. Connection terminal 14 is electrically connected to positive terminal 10e via mesh portion 13. Connection terminal 15 is electrically connected to a bottom of case 9 serving as a negative terminal. Since mesh portion 13 has electric conductivity, it does not prevent connection terminal 14 and positive terminal 10e from being electrically connected to each other.

With the above-mentioned configuration, in the battery in accordance with this embodiment, even if a flame is discharged from exhaust hole 12 for some cause, the flame is extinguished by the heat absorbing effect of mesh portion 13. This is because when the flame discharged from exhaust hole 12 is brought into contact with mesh portion 13, the heat of burning gas becomes lower than the combustion temperature by the heat absorbing effect of mesh portion 13. Then, extinguished gas passes through mesh portion 13. Consequently, it is possible to minimize the damage to the surrounding, for example, a flame spreading to the surrounding. Moreover, since a gas discharged from an exhaust hole passes through mesh portion 13, it is possible to prevent battery main body 1 from being destroyed due to the increase in the internal pressure and to prevent the damage to the surrounding by the destruction. Furthermore, mesh portion 13 facing exhaust hole 12 can be formed without substantially changing the size of the battery. Therefore, it can be used as a battery of equipment whose containing volume is limited, in particular, mobile equipment.

Note here that in a battery in accordance with this embodiment, case 9 serves as a negative terminal, and sealing member 10 is provided with positive terminal 10e. However, the present invention is not necessarily limited to this configuration. The present invention can be executed by a configuration in which case 9 serves as a positive terminal and sealing member 10 serves as a negative terminal. The same is true in the below-mentioned embodiments.

Note here that this battery can be electrically connected to connection terminal 14 via mesh portion 13. Thus, this battery can be handled similarly to a conventional battery without including mesh portion 13 and can be used in a wide application of use.

Furthermore, in a battery in accordance with this embodiment, battery main body 1 is a lithium ion battery. However, the present invention is not necessarily limited to this. For example, other batteries such as a manganese dioxide—lithium primary battery, a carbon fluoride—lithium primary battery, a thionyl chloride battery, and a sodium sulfur battery, and electrochemical element such as an electric double layer capacitor can be used as battery main body 1.

Second Embodiment

Figure 4A:
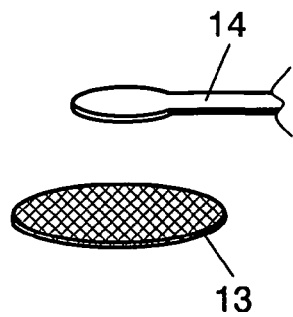
FIG. 4A is an exploded perspective view showing a principal part of a battery in accordance with a second embodiment of the present invention.
Figure 4B:
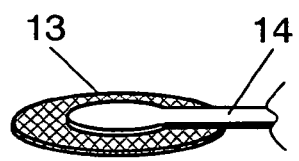
FIG. 4B is a perspective view showing a principal part of the battery shown in FIG. 4A.

FIGS. 4A and 4B show a principal part of a battery in accordance with a second embodiment of the present invention. In the first embodiment, mesh portion 13 is provided on positive terminal 10e of sealing member 10. Meanwhile, mesh portion 13 is provided on connection terminal 14 in this embodiment.

Mesh portion 13 and connection terminal 14 are fixed to each other by using a conductive adhesive, or by ultrasonic welding or resistance welding. For example, positive terminal 10e of battery main body 1 which is a lithium ion battery shown in FIGS. 1 to 3 is electrically connected to connection terminal 14. At this time, battery main body 1 and connection terminal 14 are disposed in such a manner that mesh portion 13 faces exhaust hole 12.

Although battery main body 1 and mesh portion 13 are not fixed directly to each other, a configuration in which mesh portion 13 is located to face exhaust hole 12 is included in the present invention.

In the battery in accordance with this embodiment, when connection terminal 14 is connected to positive terminal 10e, it is necessary to adjust the position of mesh portion 13 with respect to exhaust hole 12. However, battery main body 1 can be stored and handled separately from mesh portion 13 that needs to be carefully in order not to be deformed or destroyed, thus facilitating assembling operation as a whole.

Third Embodiment

Figure 5:
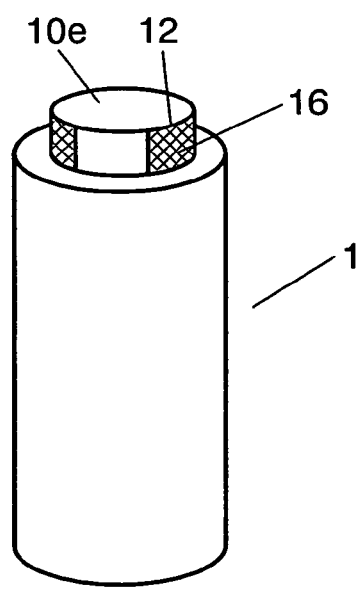
FIG. 5 is a perspective view of a battery in accordance with a third embodiment of the present invention.

FIG. 5 is a perspective view showing a battery in accordance with a third embodiment of the present invention. The battery in accordance with this embodiment includes, for example, mesh portion 16 that covers only exhaust hole 12 formed on positive terminal 10e of battery main body 1.

With this configuration, a gas or a flame discharged from exhaust hole 12 passes through mesh portion 16 reliably. Consequently, the flame can be extinguished by the heat absorbing effect of mesh portion 16. Furthermore, since a gas passes through mesh portion 16, destruction of battery main body 1 can be prevented.

Furthermore, since mesh portion 16 does not protrude from the contour of battery main body 1, the battery can be stored and handled easily. Moreover, connection terminal connected to positive terminal 10e need not to be subjected to processing or dimensional coordination, conventionally used connection terminals and the configurations of battery packs can be used.

Fourth Embodiment

Figure 6A:
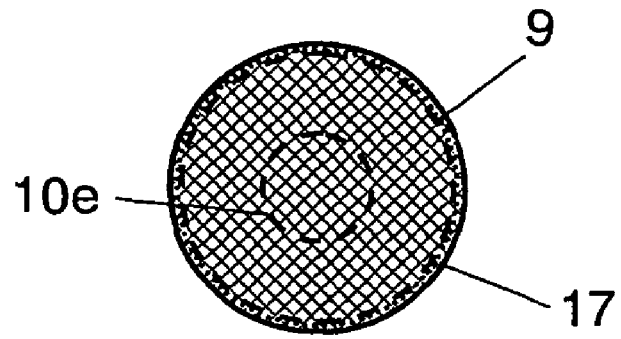
FIG. 6A is a plan view of a battery in accordance with a fourth embodiment of the present invention.
Figure 6B:
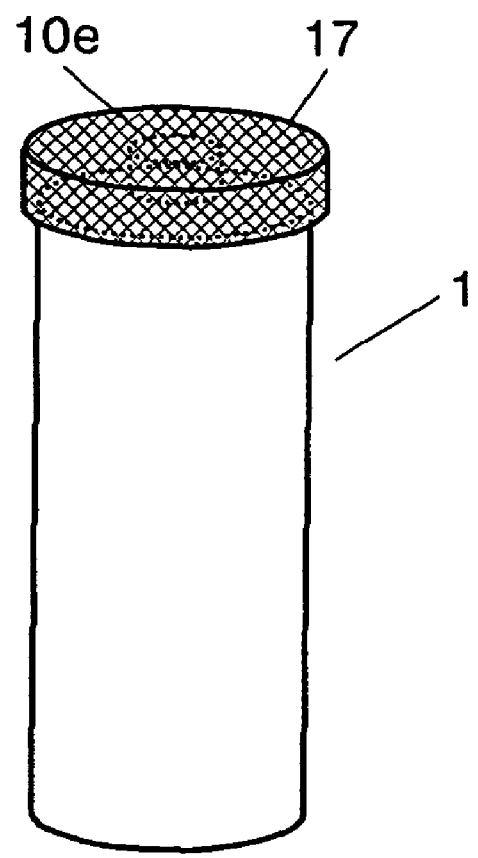
FIG. 6B is a perspective view of the battery shown in FIG. 6A.

FIG. 6A and FIG. 6B are a plan view and a perspective view each showing a configuration of a battery in accordance with a fourth embodiment of the present invention, respectively. Mesh portion 17 of the battery in accordance with this embodiment is formed in a cylindrical shape. Mesh portion 17 covers an opening of battery main body 1 including positive terminal 10e of a sealing member (not shown) having an exhaust hole (not shown).

Since the exhaust hole is covered with mesh portion 17, a gas or a flame discharged from an exhaust hole passes through mesh portion 17 without fail. Thus, the flame can be extinguished reliably. In particular, since mesh portion 17 is formed in a cylindrical shape, a surface area is increased and the thermal capacity is increased. Therefore, the heat absorbing effect becomes higher and the probability that flames can be extinguished reliably and rapidly increases. Furthermore, since the heat of flames expanding along mesh portion 17 is absorbed by mesh portion 17 extending to the side surface of case 9, flames can be extinguished more reliably.

Fifth Embodiment

Figure 7A:
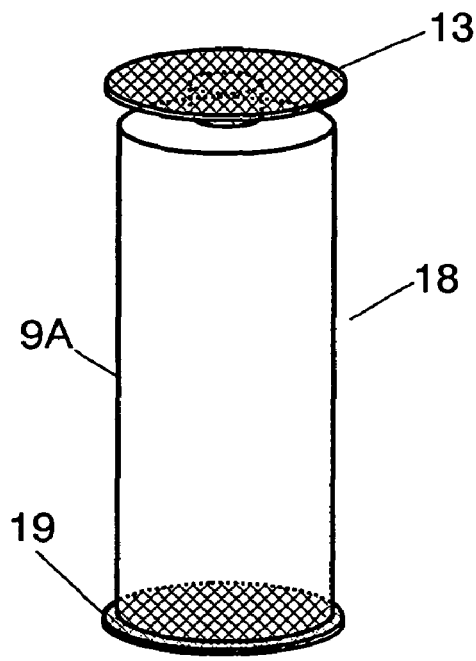
FIG. 7A is a perspective view of a battery in accordance with a fifth embodiment of the present invention.

FIG. 7A is a perspective view showing a configuration of a battery in accordance with a fifth embodiment of the present invention. Battery main body 18 of a battery in accordance with this embodiment includes exhaust holes not only on a sealing member at an opening located on the upper side of battery main body 18 but also on a bottom of case 9A defining a contour of battery main body 18. Since a safety valve is provided also on the bottom of case 9A, contents of battery main body 18 do not flow out unless the internal pressure of battery main body 18 is increased to the specified value or more.

Since mesh portion 13 facing an exhaust hole (not shown) of a sealing member provided on an opening of battery main body 18 is the same as mesh portion 13 shown in FIG. 2, the description thereof is omitted. Mesh portion 19 is formed in a disk-like shape (circular shape) similar to mesh portion 13. Since the size of mesh portion 19 is the same as that of the bottom surface of battery main body 18, this battery can be stored and handled easily as in battery main body 18 alone.

It is preferable that the exhaust hole is formed on the bottom surface of case 9A and mesh portion 19 covers the bottom of case 9A in this way. Thus, even when the exhaust hole is formed on the bottom surface, it is possible to extinguish a discharged flame and to prevent the flame from spreading to the surrounding of battery main body 18.

Figure 7B:
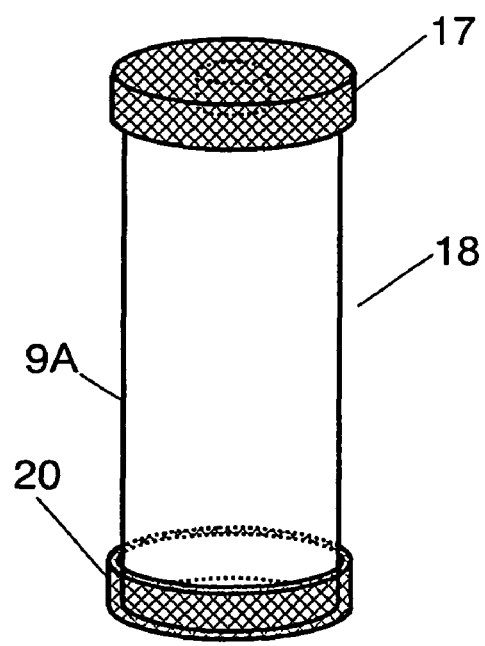
FIG. 7B is a perspective view of another battery in accordance with the fifth embodiment of the present invention.

FIG. 7B is a perspective view showing another configuration of a battery in accordance with the fifth embodiment of the present invention. This battery is different from the battery shown in FIG. 7A in that mesh portion 17 is used instead of mesh portion 13 and mesh portion 20 is used instead of mesh portion 19. Since mesh portion 17 is the same as mesh portion 17 shown in FIG. 6, the description thereof is omitted herein. Mesh portion 20 is formed in a cylindrical shape similar to mesh portion 17. Since mesh portion 20 is formed so as to oppose the side surface of case 9A, heat capacity is increased and a larger excellent extinguishing effect can be expected. Furthermore, since the heat of flames expanding along mesh portion 20 is absorbed by mesh portion 20 extending to the side surface of case 9A, flames can be extinguished more reliably.

Note here that FIGS. 7A and 7B show a configuration in which an exhaust hole (not shown) is formed in a sealing member of an opening of battery main body 18. However, an exhaust hole may be formed only on the bottom of the case constituting battery main body 18 without forming an exhaust hole on a sealing member, and mesh portion 19 or mesh portion 20 may be applied. Furthermore, depending upon the inside configuration of battery main body 18, an exhaust hole may be formed in a portion other than the bottom of the case and the portion in which the exhaust hole is formed may be covered with a mesh portion.

Sixth Embodiment

Figure 8A:
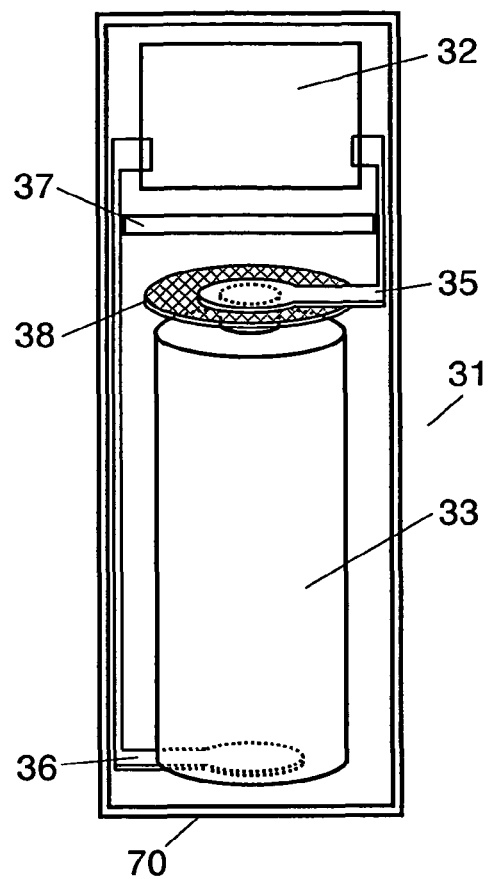
FIG. 8A is a configuration view of a battery pack in accordance with a sixth embodiment of the present invention.

FIG. 8A is a configuration view showing a battery pack in accordance with a sixth embodiment of the present invention. Battery pack 31 of this embodiment includes circuit 32, battery 33, connection terminals 35 and 36, enclosure 70 containing them therein, and partition 37. Connection terminals 35 and 36 connect circuit 32 to battery 33. Partition 37 separates a portion for containing circuit 32 from a portion for containing battery 33.

Battery pack 31 is incorporated and used in mobile equipment such as notebook-sized personal computer in a state in which battery pack 31 contains circuit 32 and battery 33. Battery 33 has an exhaust hole (not shown) only on the upper part in the drawings. Connection terminal 35 is provided with circular shaped mesh portion 38 according to the exhaust hole of battery 33. Mesh portion 38 is disposed to face the exhaust hole formed on battery 33. That is to say, mesh portion 38 is the same as mesh portion 13 shown in FIG. 4B. Therefore, it is preferable that mesh portion 38 covers the exhaust hole of battery 33.

Figure 8B:
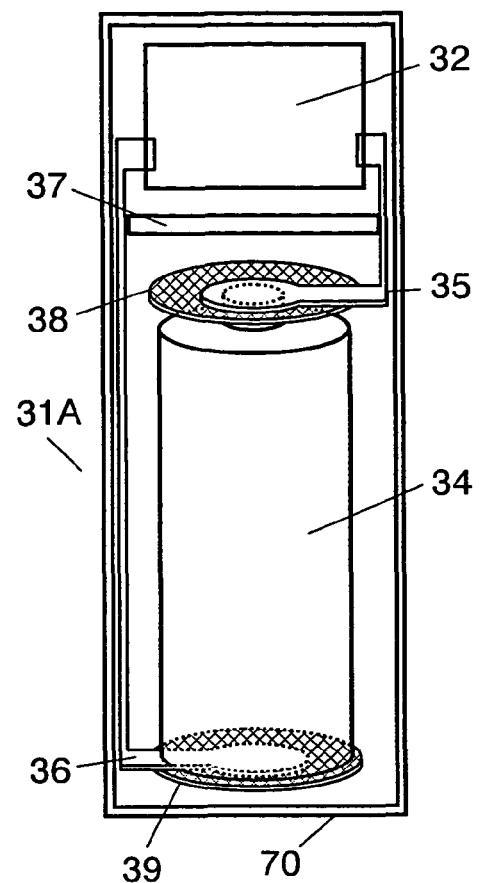

FIG. 8B is a configuration view showing another battery pack in accordance with the sixth embodiment of the present invention. Battery pack 31A is different from battery pack 31 shown in FIG. 8A in that battery 34 is used instead of battery 33 and mesh portion 39 is used on the lower part of battery 34.

Battery 34 has an exhaust hole (not shown) also on the lower part in addition to the upper part. Connection terminal 36 is provided with circular shaped mesh portion 39 with respect to the exhaust hole on the lower part of battery 34. Mesh portion 39 is also disposed so as to face the exhaust hole formed on battery 34.

When the internal pressure of batteries 33 and 34 is increased to the specified value or higher, safety valves rupture and a gas or a flame is discharged from the exhaust holes for some causes, the flame or gas is extinguished by mesh portions 38 and 39. Therefore, it is possible to prevent the flame from spreading to the surrounding of batteries 33 and 34. Furthermore, since mesh portions 38 and 39 can be formed without substantially changing the size of batteries 33 and 34, the size of the battery pack is not substantially changed. Therefore, it can be used as a battery of equipment whose containing volume is limited, in particular, mobile equipment.

It is preferable that enclosure 70 and partition 37 are made of flame retardant materials, for example, phenolic resin, glass epoxy resin, and UNILATE® so as to minimize the damage to circuit 32 and equipment to be used.

FIG. 9A is a configuration view showing a further battery pack in accordance with the sixth embodiment of the present invention. In battery pack 31 B, mesh portion 40 is formed in a cylindrical shape. Mesh portion 40 covers an opening of a case constituting battery 33 and covers an exhaust hole. That is to say, mesh portion 40 is the same as mesh portion 17 shown in FIG. 6A. That is to say, a part of mesh portion 40 covering an opening of the case of battery 33 is disposed so as to oppose the side surface of the case. With this configuration, since a flame discharged from an exhaust hole (not shown) of battery 33 passes through mesh portion 40 without fail, the flame can be extinguished by the heat absorbing effect of mesh portion 40 whose heat capacity is large. Moreover, without increasing the size of battery 33, mesh portion 40 can be expanded.

FIG. 9B is a configuration view showing a yet further battery pack in accordance with the sixth embodiment of the present invention. In battery pack 31 C, mesh portion 41 is also formed in a cylindrical shape on the lower side of battery 34 in addition to mesh portion 40. Mesh portion 41 is disposed in such a manner that a part of mesh portion 41 opposes the lower side surface of battery 34 and covers an exhaust hole (not shown) formed on the bottom surface of battery 34. Since a flame discharged from the exhaust hole formed on the bottom surface of battery 34 passes through mesh portion 41 without fail, the flame can be extinguished by the heat absorbing effect of mesh portion 41 whose heat capacity is large.

Figure 10A:
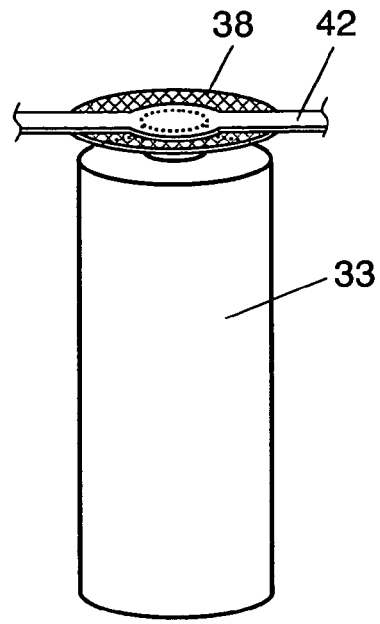
FIGS. 10A and 10B are configuration views showing a principal part of other battery packs in accordance with the sixth embodiment of the present invention.
Figure 10B:
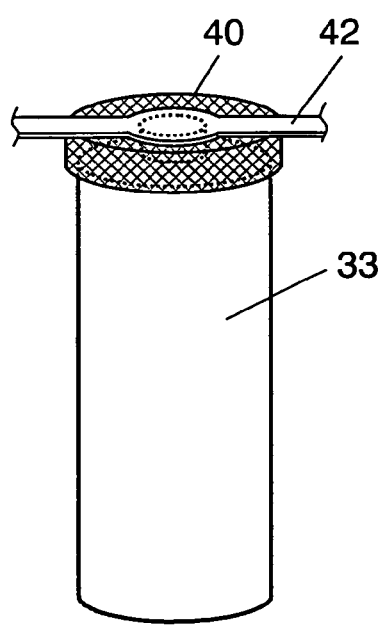

FIGS. 10A and 10B are configuration views showing a principal part of other battery packs in accordance with the sixth embodiment of the present invention. In battery packs 31 to 31C shown in FIGS. 8A to 9B, connection terminal 35 is electrically connected to the battery via a mesh portion at the end portion thereof. On the other hand, connection terminals 42 shown in FIGS. 10A and 10B are electrically connected to the battery via a mesh portion at the middle portion other than the end portion.

Connection terminals 35 shown in FIGS. 8A through 9B are positioned and fixed at a position along the inner wall surface of enclosure 70. Consequently, the tip portion of connection terminal 35 has a degree of freedom. On the other hand, connection terminal 42 has a shape in which the tip portion is further extended. With this shape, the tip portion of connection terminal 42 can be positioned and fixed on the inner wall surface of enclosure 70.

With this configuration, the degree of freedom of the position of connection terminal 42 is controlled, so that displacement and tilt of mesh portions 38 and 40 provided on connection terminal 42 can be prevented. As a result, the displacement in positional relation between the exhaust hole of battery 33 and mesh portions 38 and 40 can be controlled, so that the extinguishing effect by mesh portions 38 and 40 can be sufficiently exhibited.

Seventh Embodiment

Figure 11:
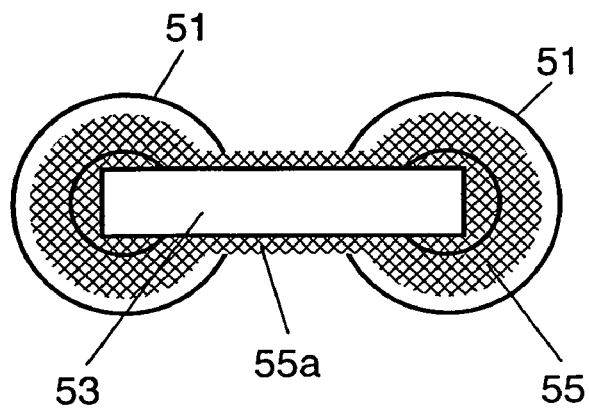
FIG. 11 is a plan view showing a principal part of a battery pack in accordance with a seventh embodiment of the present invention.
Figure 12:
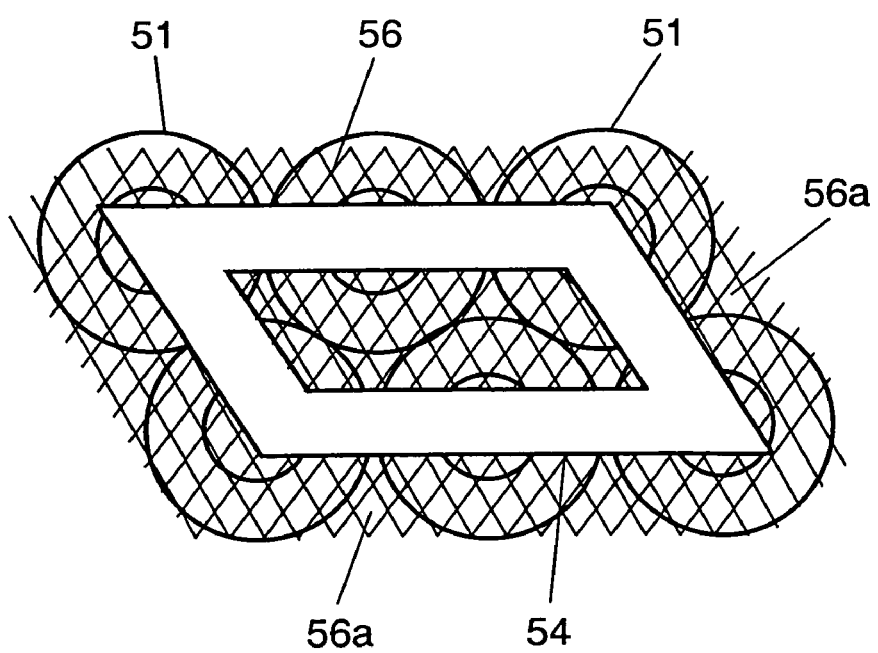
FIG. 12 is a plan view showing a principal part of another battery pack in accordance with the seventh embodiment of the present invention.

FIGS. 11 and 12 are plan views showing a principal part of a battery pack in accordance with a seventh embodiment of the present invention. A battery pack in this embodiment contains a plurality of batteries 51 in which a mesh portion is disposed so as to face an exhaust hole of each batteries 51. Note here that an enclosure and the like are omitted in the drawings.

FIG. 11 shows a battery pack containing two batteries 51, and FIG. 12 shows a battery pack containing six batteries 51. In both cases, band-shaped connection terminals 53 and 54 electrically connect circuit (not shown) to batteries 51. Accordance to the shapes of connection terminals 53 and 54, mesh portions 55 and 56 are attached to connection terminals 53 and 54.

As shown in FIG. 11, when two batteries 51 are contained, connection terminal 53 is formed in a linear shape. Then, mesh portion 55 is disposed on the upper part of batteries 51 each having an exhaust hole (not shown) thereon in such a manner that mesh portion 55 faces each of the exhaust holes.

In order to extinguish a flame discharged from the exhaust holes, mesh portion 55 may be disposed only on the upper part of battery 51. However, as shown in FIG. 11, mesh portion 55 has middle portion 55a that is a portion other than the upper part of batteries 51 according to the shape of connection terminal 53. With such a configuration, the heat capacity of mesh portion 55 is increased and a flame extinguishing effect is improved. Furthermore, the strength of mesh portion 55 is improved and the displacement and tilt can be suppressed. Thus, the positional relation with respect to the exhaust holes can be kept appropriately and the extinguishing effect can be maintained.

As shown in FIG. 12, when six batteries 51 are contained, connection terminal 54 is formed in a parallelogram shape according to the arrangement of batteries 51. Then, mesh portion 56 is disposed on the upper part of batteries 51 each having an exhaust hole (not shown) thereon in such a manner that mesh portion 56 faces each of the exhaust holes.

In order to extinguish a flame discharged from the exhaust holes, mesh portion 56 may be disposed only on the upper part of batteries 52. However, mesh portion 56 has middle portion 56a that is other than the upper part of batteries 51 according to the shape of connection terminal 54. With such a configuration, the heat capacity of mesh portion 56 is increased, and a flame extinguishing effect is improved. Furthermore, the strength of mesh portion 56 is improved and displacement and tilt can be suppressed. Thus, the positional relation with respect to the exhaust holes can be kept appropriately and the extinguishing effect can be maintained.

Eighth Embodiment

Figure 13:
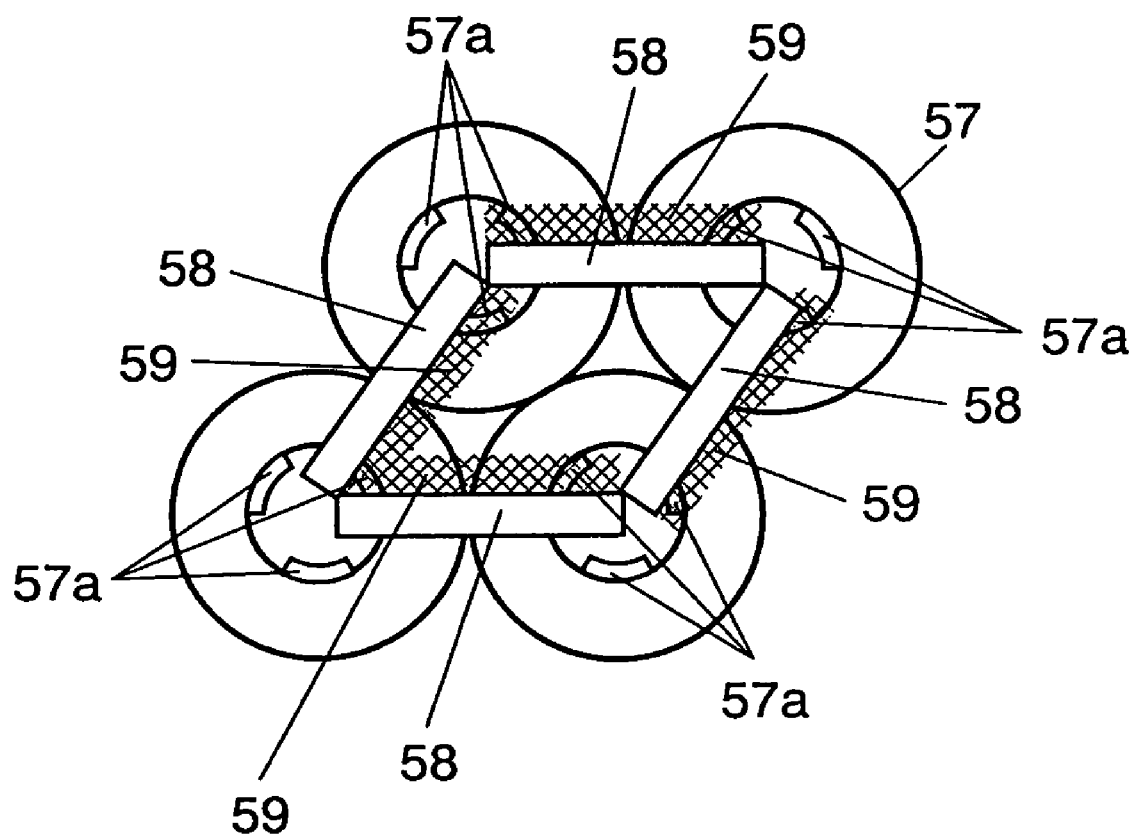
FIG. 13 is a plan view showing a principal part of a battery pack in accordance with an eighth embodiment of the present invention.

FIG. 13 is a plan view showing a principal part of a battery pack in accordance with an eighth embodiment of the present invention. A battery pack in accordance with this embodiment contains a plurality of batteries 57 in which mesh portion 59 is disposed so as to face an exhaust hole of each battery 57. Note here that an enclosure and the like are omitted in the drawing.

Also in this battery pack, band-shaped connection terminal 58 electrically connects a circuit (not shown) to four batteries 57. Mesh portion 59 is formed according to the shape of connection terminal 58 and attached to connection terminal 58.

However, mesh portion 59 faces not all exhaust holes 57a formed on the upper part of battery 57. That is to say, mesh portion 59 is disposed so as to face exhaust holes facing the other batteries among exhaust holes 57a of four batteries 57. In other words, mesh portion 59 is disposed so as to face exhaust holes that may heat other batteries due to a discharged flame. Thus, even if one of the plurality of contained batteries 57 fires, a flame discharged from exhaust holes facing the other batteries 57 is brought into contact with mesh portion 59 without fail. As a result, heat is deprived off and the flame is extinguished. Consequently, flame spreading to the other batteries 57 that do not fire can be prevented. With this configuration, it is possible to prevent a flame from spreading from one battery to another by using the necessary minimum members. That is to say, fire spreading can be prevented while preventing the size of a battery pack from increasing.

Ninth Embodiment

Figure 14A:
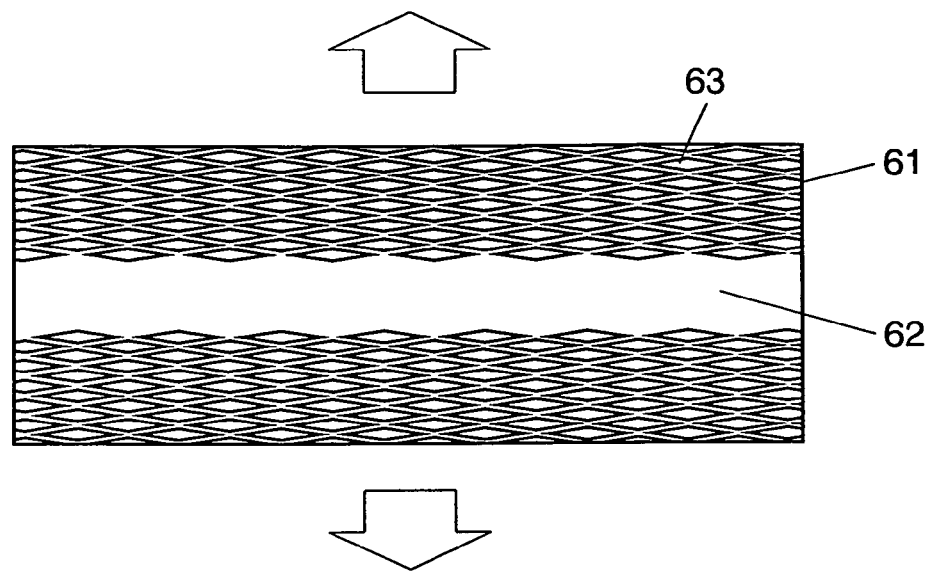
FIGS. 14A and 14B are views showing a method of manufacturing a connection terminal used in a battery pack in accordance with a ninth embodiment of the present invention.
Figure 14B:
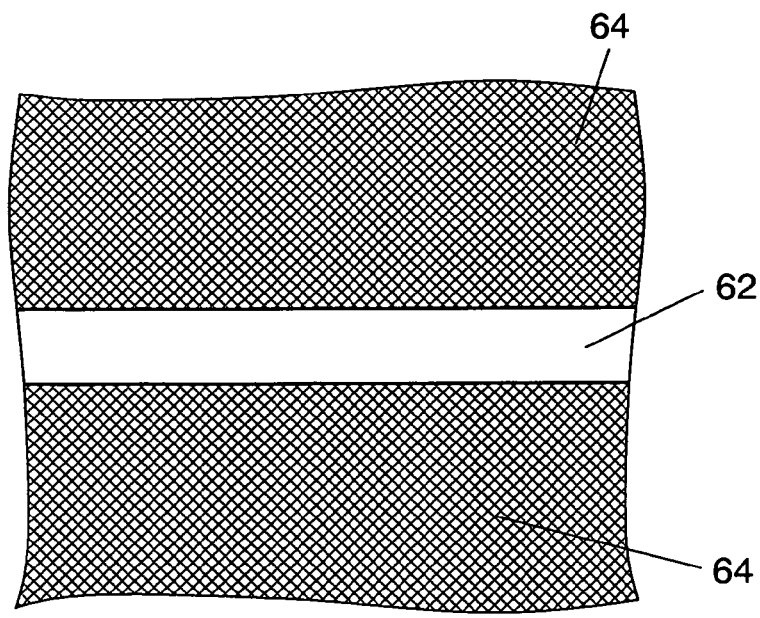

FIGS. 14A and 14B are views showing a method of manufacturing a connection terminal used in a battery pack in accordance with a ninth embodiment of the present invention.

As shown in FIG. 14A, firstly, metal plate 61 made of nickel or copper is provided with staggered holes 63 except for a part of connection terminal 62 formed in a band shape. The shape of hole 63 is preferably rhombus. However, the shape is not necessarily limited to rhombus.

Thereafter, a portion provided with holes 63 is stretched in the direction away from connection terminal 62, thereby expanding holes 63. As a result, as shown in FIG. 14B, it is possible to form mesh portion 64 formed along band-shaped connection terminal 62.

Thus, in the method of manufacturing a connection terminal used in a battery pack in accordance with this embodiment, connection terminal 62 provided with mesh portion 64 is manufactured by the above-mentioned processes. Thus, since mesh portion 64 and connection terminal 62 are formed together, handling of a battery pack at the time of manufacturing becomes easy. Moreover, an operation for fixing and connecting between mesh portion 64 and connection terminal 62 is not necessary, and an optimum connection terminal according to the arrangement of a battery pack and a battery can be manufactured easily. Furthermore, heat conduction between mesh portion 64 and connection terminal 62 is large, so that the heat absorbing effect with respect to the heat of a flame can be also increased.

That is to say, it is preferable that mesh portion 64 is provided with connection terminal 62. Thus, mesh portion 64 is held by connection terminal 62 fixed inside a battery pack. Therefore, the position of mesh portion 64 can be kept stably inside the battery pack, and the positional relation with respect to an exhaust hole of a battery can be kept appropriately. Moreover, since the heat of a flame discharged from the exhaust hole of the battery is absorbed by not only mesh portion 64 but also connection terminal 62, the extinguishing function is improved. Consequently, a flame can be extinguished for a shorter time.

Furthermore, it is preferable that connection terminal 62 is formed in a band shape, and mesh portion 64 is provided along connection terminal 62. Mesh portion 64 is formed along connection terminal 62 to expand an area, and thereby the heat absorbing effect of mesh portion 64 can be improved and the flame extinguishing function can be improved. Moreover, since mesh portion 64 is provided along connection terminal 62, even when an area of mesh portion 64 is expanded, the position of mesh portion 64 can be kept stably inside the battery pack.

Note here that in the above description, a configuration in which a mesh portion is disposed between a battery and a connection terminal. The present invention is not necessarily limited to this configuration. The mesh portions may be disposed on the connection terminal connected to the battery.

Furthermore, a cylindrical battery is described as an example. However, the shape of a battery is not particularly limited.

Furthermore, a battery pack having circuit 32 is described in the sixth to eighth embodiments. However, circuit 32 is not essential.

As mentioned above, the present invention is useful for realizing a nonaqueous electrolyte secondary battery having an increased capacity and high reliability, which is expected to be demanded in the future.

The invention claimed is:

1. A battery pack comprising:
 a battery including:
  an electrode group having a positive electrode, a negative electrode opposing the positive electrode, and an electrolyte interposed between the positive electrode and the negative electrode;
  a case having an opening and containing the electrode group; and
  a sealing member closing the opening of the case,
 wherein an exhaust hole is formed in at least one of the case and the sealing member;
  a connection terminal electrically connected to the battery;
  an enclosure containing the battery and the connection terminal; and
  a mesh member positioned outside the case and inside the enclosure so as to face the exhaust hole, wherein the mesh member and the sealing member are different members.

2. The battery pack according to claim 1,
 wherein the mesh member covers the exhaust hole.

3. The battery pack according to claim 1,
 wherein the sealing member is provided with the exhaust hole, and the mesh member covers the opening of the case.

4. The battery pack according to claim 3,
 wherein the mesh member is disposed in such a manner that a part of the mesh member opposes a side surface of the case.

5. The battery pack according to claim 1,
 wherein the case is provided with the exhaust hole, and the mesh member covers a portion of the case provided with the exhaust hole.

6. The battery pack according to claim 5,
 wherein the mesh member is disposed in such a manner that a part of the mesh member opposes a side surface of the case.

7. The battery pack according to claim 1,
 wherein the battery is one of a plurality of batteries, the connection terminal is formed so as to be electrically connected to the plurality of batteries, and the mesh member faces the exhaust holes of the plurality of batteries.

8. The battery pack according to claim 7,
wherein the plurality of batteries include a first battery, a second battery facing the first battery, the first battery has an exhaust hole facing the second battery, and the mesh member is provided so as to face the exhaust hole facing the second battery.

9. The battery pack according to claim 1,
wherein the connection terminal is provided with the mesh member.

10. The battery pack according to claim 9,
wherein the connection terminal is formed in a band shape, and the mesh member is provided along the connection terminal.

11. The battery pack according to claim 1, wherein the mesh member is formed of a thermally conductive material.

12. The battery pack according to claim 1, wherein the mesh member is formed of an electrically conductive material.

13. The battery pack according to claim 8, wherein the mesh member has mesh holes whose size is not smaller than 0.1 mm ×0.1 mm and not larger than 3.0 mm ×3.0 mm.

14. The battery pack according to claim 1, wherein the mesh member has a first surface and a second surface opposite to the first surface, the first surface being in electrical contact with the connection terminal, and the second surface being in electrical contact with one of the positive electrode and the negative electrode.

* * * * *